(12) United States Patent
Richter et al.

(10) Patent No.: US 6,982,540 B2
(45) Date of Patent: Jan. 3, 2006

(54) ENERGY MANAGEMENT SYSTEM FOR A MOTOR VEHICLE ELECTRICAL SYSTEM

(75) Inventors: Gerolf Richter, Hildesheim (DE); Christian Rosenkranz, Wunstorf (DE)

(73) Assignee: VB Autobatterie GmbH, Hannover (DE)

(*) Notice: Subject to any disclaimer, the term of this patent is extended or adjusted under 35 U.S.C. 154(b) by 122 days.

(21) Appl. No.: 10/138,198

(22) Filed: May 3, 2002

(65) Prior Publication Data

US 2002/0171392 A1 Nov. 21, 2002

(30) Foreign Application Priority Data

May 5, 2001 (DE) .......................................... 101 21 962

(51) Int. Cl.
*H02J 7/00* (2006.01)

(52) U.S. Cl. ..................................... 320/104; 180/65.1
(58) Field of Classification Search ................ 320/104, 320/103, 132, 137; 180/65.1, 65.2, 65.3, 180/65.4; 340/635, 636; 123/316
See application file for complete search history.

(56) References Cited

U.S. PATENT DOCUMENTS

| | | | |
|---|---|---|---|
| 3,906,329 A | 9/1975 | Bader | 320/134 |
| 4,153,867 A | 5/1979 | Jungfer et al. | 324/436 |
| 4,193,025 A | 3/1980 | Frailing et al. | 324/427 |
| 4,207,611 A | 6/1980 | Gordon | 703/33 |
| 4,322,685 A | 3/1982 | Frailing et al. | 324/429 |
| 4,595,880 A | 6/1986 | Patil | 324/427 |
| 4,642,600 A | 2/1987 | Gummelt et al. | 338/34 |
| 4,659,977 A | 4/1987 | Kissel et al. | 320/190 |
| 4,665,370 A | 5/1987 | Holland | 324/429 |
| 4,719,427 A | 1/1988 | Morishita et al. | 324/427 |

(Continued)

FOREIGN PATENT DOCUMENTS

| | | |
|---|---|---|
| DE | 2 242 510 | 4/1974 |
| DE | 22 42 510 | 4/1974 |
| DE | 25 11 426 A1 | 9/1975 |
| DE | 33 34 128 A1 | 4/1985 |
| DE | 37 12 629 C2 | 10/1987 |

(Continued)

OTHER PUBLICATIONS

Intelec ' 88—Tenth International communications Energy Conference, "A look at the Impedance of a Cell—S.L. DeBardelaben, New York Telephone Company," bearing a designation "Oct. 30–Nov. 2, 1988." (6 sheets).

Journal of Applied Electrochemistry, vol. 10 No. 1, Jan. 1980—The Impedance of Electrical Storage Cells—N.A. Hampson, s.A.G.R. Karunathilaka, Department of Chemistry, R. Leek, Department of Electronic and Electrical Engineering, University of Technology, Loughborough, Liecestershire, UK (11 sheets).

(Continued)

*Primary Examiner*—Donald Sparks
*Assistant Examiner*—Lawrence Luk
(74) *Attorney, Agent, or Firm*—Foley & Lardner LLP

(57) ABSTRACT

An energy management system for an electrical system of a motor vehicle subjected to a large number of loads including at least one generator, at least one storage battery, a controller of energy distribution in the system which bases such control at least on efficiency of individual components of the motor vehicle involved in power generation, energy storage and power consumption. In order to determine the overall efficiency of the energy storage unit, which comprises at least one energy store, the state of charge, the temperature of the store and the absolute magnitude of the charging and discharging currents are taken into account. In addition to mechanically driven generators, the system can possess a fuel cell and, in addition to an electrochemical energy store, further physical stores such as double-layer capacitors.

15 Claims, 6 Drawing Sheets

U.S. PATENT DOCUMENTS

| | | | |
|---|---|---|---|
| 4,805,571 A * | 2/1989 | Humphrey | 123/316 |
| 4,816,736 A | 3/1989 | Dougherty et al. | 320/116 |
| 4,876,513 A | 10/1989 | Brilmyer et al. | 324/427 |
| 4,888,716 A | 12/1989 | Ueno | 702/63 |
| 4,937,528 A | 6/1990 | Palanisamy | 324/430 |
| 4,943,777 A | 7/1990 | Nakamura et al. | 324/433 |
| 4,952,861 A | 8/1990 | Horn | 320/133 |
| 5,002,840 A | 3/1991 | Klebenow et al. | 429/9 |
| 5,032,825 A | 7/1991 | Kuznicki | 340/636.15 |
| 5,055,656 A | 10/1991 | Farah et al. | 219/209 |
| 5,079,716 A | 1/1992 | Lenhardt et al. | 320/153 |
| 5,130,699 A | 7/1992 | Reher et al. | 340/661 |
| 5,159,272 A | 10/1992 | Rao et al. | 324/429 |
| 5,162,164 A | 11/1992 | Dougherty et al. | 429/9 |
| 5,204,610 A | 4/1993 | Pierson et al. | 320/126 |
| 5,223,351 A | 6/1993 | Wruck | 429/19 |
| 5,280,231 A | 1/1994 | Kato et al. | 322/28 |
| 5,281,919 A | 1/1994 | Palanisamy | 324/427 |
| 5,316,868 A | 5/1994 | Dougherty et al. | 429/9 |
| 5,321,627 A | 6/1994 | Reher | 702/63 |
| 5,352,968 A | 10/1994 | Reni et al. | 320/136 |
| 5,381,096 A | 1/1995 | Hirzel | 324/427 |
| 5,404,129 A | 4/1995 | Novak et al. | 340/428 |
| 5,412,323 A | 5/1995 | Kato et al. | 324/429 |
| 5,416,402 A | 5/1995 | Reher et al. | 940/636.15 |
| 5,428,560 A | 6/1995 | Leon et al. | 703/13 |
| 5,439,577 A | 8/1995 | Weres et al. | 204/268 |
| 5,488,283 A | 1/1996 | Dougherty et al. | 307/10.1 |
| 5,549,984 A | 8/1996 | Dougherty | 429/61 |
| 5,552,642 A | 9/1996 | Dougherty et al. | 307/10.3 |
| 5,563,496 A | 10/1996 | McClure | 320/128 |
| 5,572,136 A | 11/1996 | Champlin | 324/426 |
| 5,578,915 A | 11/1996 | Crouch, Jr. et al. | 324/428 |
| 5,656,915 A | 8/1997 | Eaves | 320/118 |
| 5,680,050 A | 10/1997 | Kawai et al. | 324/427 |
| 5,698,965 A | 12/1997 | York | 307/130 |
| 5,721,688 A | 2/1998 | Bramwell | 702/63 |
| 5,744,936 A | 4/1998 | Kawakami | 320/130 |
| 5,744,963 A | 4/1998 | Arai et al. | 324/427 |
| 5,761,072 A | 6/1998 | Bardsley, Jr. et al. | 702/63 |
| 5,773,977 A | 6/1998 | Dougherty | 324/49 |
| 5,808,367 A * | 9/1998 | Akagi et al. | 290/40 |
| 5,808,445 A | 9/1998 | Aylor et al. | 320/132 |
| 5,818,116 A * | 10/1998 | Nakae et al. | 290/38 R |
| 5,818,333 A | 10/1998 | Yaffe et al. | 340/455 |
| 5,896,023 A | 4/1999 | Richter | 320/104 |
| 5,898,292 A | 4/1999 | Takemoto et al. | 320/136 |
| 5,936,383 A | 8/1999 | Ng et al. | 320/132 |
| 5,965,954 A | 10/1999 | Johnson et al. | 307/10.3 |
| 5,977,654 A | 11/1999 | Johnson et al. | 307/10.3 |
| 5,990,660 A | 11/1999 | Meissner | 320/127 |
| 6,016,047 A | 1/2000 | Notten et al. | 320/137 |
| 6,037,749 A | 3/2000 | Parsonage | 320/132 |
| 6,037,777 A | 3/2000 | Champlin | 324/430 |
| 6,057,666 A | 5/2000 | Dougherty et al. | 320/104 |
| 6,087,808 A | 7/2000 | Pritchard | 320/132 |
| 6,091,325 A | 7/2000 | Zur et al. | 340/455 |
| 6,118,252 A | 9/2000 | Richter | 320/132 |
| 6,118,275 A | 9/2000 | Yoon et al. | 324/427 |
| 6,144,185 A | 11/2000 | Dougherty et al. | 320/132 |
| 6,160,382 A | 12/2000 | Yoon et al. | 320/136 |
| 6,222,341 B1 | 4/2001 | Dougherty et al. | 320/104 |
| 6,268,712 B1 | 7/2001 | Laig-Horstebrock et al. | 320/132 |
| 6,271,642 B1 | 8/2001 | Dougherty et al. | 320/104 |
| 6,296,593 B1 * | 10/2001 | Gotou et al. | 477/176 |
| 6,300,763 B1 | 10/2001 | Kwok | 324/427 |
| 6,304,059 B1 | 10/2001 | Chalasani et al. | 320/118 |
| 6,331,762 B1 | 12/2001 | Bertness | 320/134 |
| 6,369,578 B1 | 4/2002 | Crouch, Jr. et al. | 324/426 |
| 6,388,421 B2 * | 5/2002 | Abe | 320/104 |
| 6,388,450 B2 | 5/2002 | Richter et al. | 324/427 |
| 6,392,389 B1 | 5/2002 | Kohler | 320/192 |
| 6,392,414 B2 | 5/2002 | Bertness | 324/429 |
| 6,392,415 B2 | 5/2002 | Laig-Horstebrock et al. | 324/433 |
| 6,417,668 B1 | 7/2002 | Howard et al. | 324/426 |
| 6,424,157 B1 | 7/2002 | Gollomp et al. | 324/430 |
| 6,441,585 B1 | 8/2002 | Bertness | 320/132 |
| 6,445,158 B1 | 9/2002 | Bertness et al. | 320/104 |
| 6,452,361 B2 | 9/2002 | Dougherty et al. | 320/104 |
| 6,472,875 B1 | 10/2002 | Meyer | 324/327 |
| 6,495,990 B2 | 12/2002 | Champlin | 320/132 |
| 6,507,194 B2 | 1/2003 | Suzuki | 324/428 |
| 6,515,452 B2 | 2/2003 | Choo | 320/132 |
| 6,515,456 B1 | 2/2003 | Mixon | 320/160 |
| 6,522,148 B2 | 2/2003 | Ochiai et al. | 324/428 |
| 6,534,992 B2 | 3/2003 | Meissner et al. | 324/426 |
| 6,556,019 B2 | 4/2003 | Bertness | 324/426 |
| 6,600,237 B1 | 7/2003 | Meissner | 307/34 |
| 6,608,482 B2 | 8/2003 | Sakai et al. | 324/426 |
| 6,653,818 B2 | 11/2003 | Laig-Horstebrock et al. | 320/132 |
| 2002/0008495 A1 | 1/2002 | Dougherty et al. | 320/104 |
| 2002/0026252 A1 | 2/2002 | Wruck et al. | 700/90 |
| 2002/0031700 A1 | 3/2002 | Wruck et al. | 429/61 |
| 2003/0007369 A1 * | 1/2003 | Gilbreth et al. | 363/35 |
| 2003/0047366 A1 | 3/2003 | Andrew et al. | 180/68.5 |
| 2003/0082440 A1 | 5/2003 | Mrotek et al. | 429/123 |
| 2003/0142228 A1 | 7/2003 | Flach et al. | 348/335 |
| 2003/0236656 A1 | 12/2003 | Dougherty | 703/14 |
| 2004/0021468 A1 | 2/2004 | Dougherty et al. | 324/429 |

FOREIGN PATENT DOCUMENTS

| | | |
|---|---|---|
| DE | 38 08 559 A1 | 9/1989 |
| DE | 39 01 680 | 3/1990 |
| DE | 38 82 374 T2 | 10/1993 |
| DE | 40 07 883 | 9/1994 |
| DE | 44 14 134 A1 | 11/1994 |
| DE | 43 39 568 | 5/1995 |
| DE | 689 24 169 T2 | 3/1996 |
| DE | 195 40 827 A1 | 5/1996 |
| DE | 195 43 874 | 5/1996 |
| DE | 197 50 309 A1 | 5/1999 |
| DE | 691 31 276 T2 | 12/1999 |
| DE | 198 47 648 A1 | 4/2000 |
| DE | 694 23 918 T2 | 8/2000 |
| DE | 199 52 693 A1 | 5/2001 |
| DE | 199 60 761 C1 | 5/2001 |
| DE | 93 21 638 U1 | 8/2001 |
| DE | 100 21 161 A1 | 10/2001 |
| DE | 699 00 638 T2 | 8/2002 |
| EP | 0 516 336 B1 | 2/1992 |
| EP | 1 116 958 A2 | 7/2001 |
| EP | 1 120 641 A2 | 8/2001 |
| WO | WO 97/15839 | 5/1997 |
| WO | WO 99 17128 | 4/1999 |
| WO | WO 99 66340 | 12/1999 |
| WO | WO 00/04620 | 1/2000 |
| WO | WO 01 15023 | 3/2001 |
| WO | WO 03/001224 A1 | 1/2003 |

OTHER PUBLICATIONS

Reed Switches, Hermetic Switches—Proximity Sensors, Hermetic Switch, Inc., Highway 92, Post Office Box 2220, Chickasha, OK 73023, http://www.hermeticswitch.com/RS frm.htm, available at least by Jan. 7, 2003 1 page.

Lehman, A., "Electrical Battery Model For Leo Application Based on Absolute Instantaneous State of Charge," Proceedings of the European Space Power Conference held in Madrid, Spain, Oct. 2–6, 1989, ESA Publications, NL, vol. 1, pp. 173–178.

Robbins, Tim & Hawkins, John, "Battery Model For Over-Current Protection Simulation of DC Distribution Systems," Telecommunications Energy Conference, 1994, Intelec '94, 16$^{th}$ International Vancouver, BC, Canada Oct. 30–Nov. 3, 1994, New York, NY, IEEE, pp. 307–314 XP001036407 ISBN: 0–7803–2034–4.

Mayer, D. et al., "Modeling and Analysis of Lead Acid Battery Operation," Ecole des Mines de Paris, XP010092137, pp. 1–3.

Mauracher, P. & Karden, E., "Dynamic Modelling of Lead/Acid Batteries Using Impedance Spectroscopy for Parameter Identification," Journal of Power Sources, Elsevier Sequoia S.A., Lausanne, Ch., vol. 67 (1997) No. 1–2, pp. 69–84, XP004095174 ISSN: 0378–7753, p. 70, line 11; p. 82, line 5, figures 2, 3, 12.

Baert, D & Vervaet, A., "Lead–Acid Battery Model for the Derivation of Peukert's Law," Electrochimica Acta, Elsevier Science Publishers, Barking, GB, vol. 44, No. 20, pp. 3491–3504 XP004168624 ISSN: 0013–4686, Mar. 8, 1999.

International Search Report for PCT/US02/19760 (international filing date Jun. 21, 2002), date of mailing Oct. 10, 2002.

Conference Proceedings, Intelec '86—International Telecommunications Energy Conference, Determining the End of Battery Life—Sheldon DeBardelaben, New York Telephone Company, bearing a designation "Oct. 19–22, 1986." (6 sheets).

HSR–003 Application Notes, Hermetic Switch, Inc., Highway 92, Post Office Box 2220, Chickasha, OK 73023, http://www.hermeticswitch.com/RS_frm.htm, available at least by Jan. 7, 2003 (1 page).

Battery Alert, Ltd., "The Easy–to–Install Battery Deterioration Warning Device", 12 Volt Model (BA101) Advertisement (2 sheets), no date.

Battery Evaluation Reports, s.e. Ross Laboratories, Inc., Apr. 1999 (1 page).

Schleuter, W., *Das elektrische Ersatzschaltbild des Bleiakkumulators unter Berücksichtigung erzwungener Elektrolytströmung*, etz Archiv, vol. 4 (1982), Issue 7, pp. 213–218.

Lürkens et al., *Ladezustandsschätzung von Bleibatterien mit Hilfe des Kalman–Filters*, etz Archiv, vol. 8 (1986), Issue 7, pp. 231–236.

Brooke, L., "Resin Keeps Batteries Cool", A1 Inside Magazine, Nov., 1998, p. 55.

Hoover, J., "Failure Modes of Batteries Removed from Service", A Presentation at the 107$^{th}$ Convention of Battery Council International, Apr. 30–May 3, 1995, p. 62.

How it Works: Reed Switch Motor, http://members.tripod.com/simplemotor/rsmotor.htm, available at least by Jan. 7, 2003, 4 pages.

Reed Relay Technical & Applications Information, COTO Technology, 55 Dupont Drive, Providence, RI, http://www.cotorelay.com/ReedTech.pdf, available at least by Jan. 6, 2003, 37–43.

Gibilisco S. and Sclater N., Co–Editors–in–Chief, "Rectifier Bridge," Encyclopedia of Electronics, 2$^{nd}$ Edition, TAB Professional and Reference Books, 1996, pp. 708–711.

"Bosch and the New E–Class", Electronic Battery Management System, Focus on Electronics, Nov. 2002 (1 sheet).

Forecast Review, The Battery Man, Nov., 1996 p. 21.

OnGuard™ XT Battery State–of–Health Monitor, 2003 Midtronics, Inc. P/N 156–983A (2 sheets).

* cited by examiner

ENERGY MANAGEMENT SYSTEM FOR A MOTOR VEHICLE ELECTRICAL SYSTEM

RELATED APPLICATION

This application claims priority of Germany Patent Application No. DE 101 21 962.8, filed May 5, 2001.

FIELD OF THE INVENTION

The subject of the invention is an energy management system for a motor vehicle electrical system including at least one generator, at least one storage battery and a large number of loads.

BACKGROUND

Future motor vehicles will likely have a different system structure than is common today. Production of electric power will likely be carried out by one or more generators which, in addition to being driven by an internal combustion engine, will also receive a supply of mechanical energy resulting from braking operations. This method, already known as braking energy recovery, makes it necessary to a still greater extent than in the standard case today of the generation of electrical energy to have generators and electrical storage media which are designed for considerably higher proportion of peak currents which are needed or provided.

Since, however, weight limits relating to the presence of a generator and a battery have to be complied with in each vehicle in order to avoid forfeiting the advantage of more efficient power generation and the associated lower fuel consumption because of an increase in vehicle mass, it is necessary to use particularly efficient components.

Within the context of the technical implementation of energy management systems for motor vehicle systems, an extremely wide range of methods for monitoring, in particular, the state of charge of the storage batteries are known.

For example, in a method of measuring the state of charge, DE-C 2242510 discloses the practice of weighting the charging current with a factor that depends on the temperature and on the state of charge of the battery itself.

DE-A 4007883 discloses a method in which the starting capacity of an accumulator is determined by measuring accumulator voltage and battery temperature and comparing with a family of curves of the state of charge which apply to the battery type to be tested.

DE-A 19543874 discloses a calculation method for the discharge characteristics and residual capacity measurement of a battery, in which likewise, current, voltage and temperature are measured, the discharge characteristics being approximated by means of a mathematical function with a curved surface.

DE-C 3901680 describes a method of monitoring the cold-start capability of a starter battery in which the starter battery is loaded from time to time with a resistance, the voltage which drops across the resistance is measured and, in a comparison with empirical values, is used to determine whether the cold-start capability of the battery is still adequate. In this case, the starting operation is used to load the starter battery.

Finally, DE-A 4339568 discloses a method of determining the state of charge of a motor vehicle starter battery in which battery current and quiescent voltage are measured and used to determine the state of charge, the battery temperature also being taken into account. In this case, the charging currents measured during different time periods are compared with one another and used to determine a residual capacity.

However, the aforementioned battery monitoring methods, whose information is at the same time a basic precondition for the specific management of the electrical energy in the vehicle electrical system, still do not contain approaches to the implementation of this control intervention required for more efficient fuel utilization.

It would, therefore, be advantageous to provide defining an energy management system and, with the aid of this system to influence the generation, consumption and storage of electrical energy in such a way that overall vehicle efficiency is improved. In addition to technical limitations, it is necessary to make "energy" decisions such that the safety of motor vehicle passengers is not restricted or compromised and vehicle comfort does not appreciably decrease.

SUMMARY OF THE INVENTION

This invention relates to an energy management system for an electrical system of a motor vehicle subjected to a large number of loads including at least one generator, at least one storage battery, a controller of energy distribution in the system which bases such control at least on efficiency of individual components of the motor vehicle involved in power generation, energy storage and power consumption.

DETAILED DESCRIPTION

Figure 1:
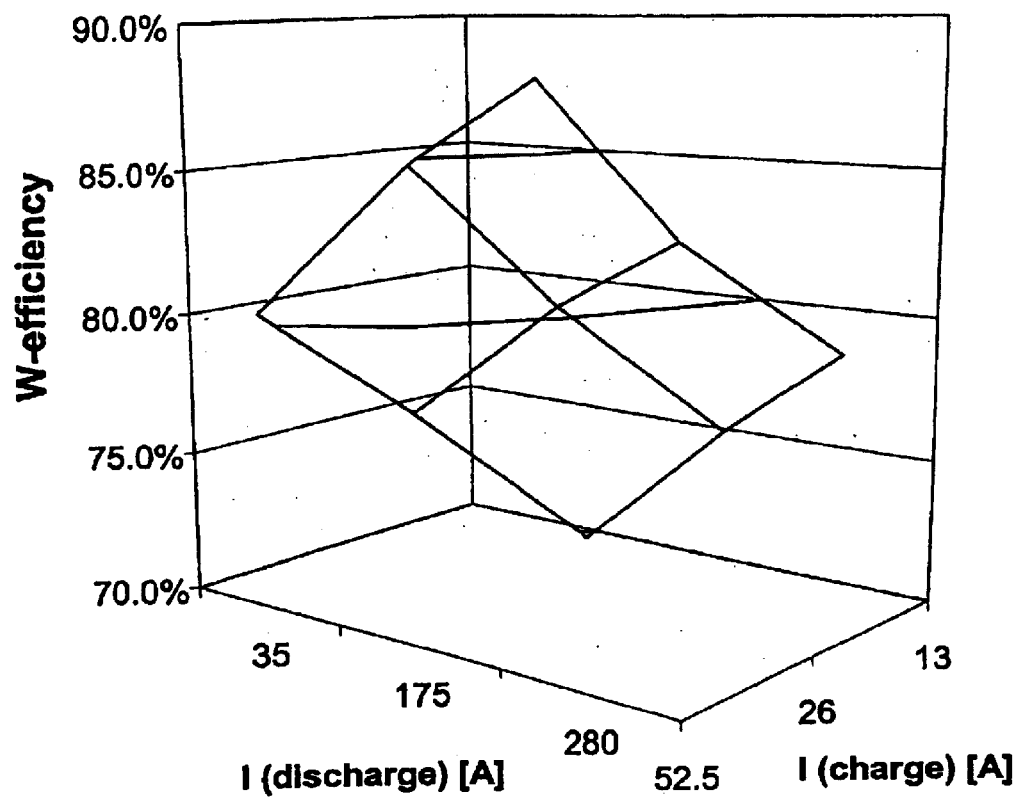
FIG. 1 is a graph of storage efficiency of a charge/discharge cycle of a lead/acid battery v. charging current v. discharging current in an 80%–100% range of state of charge taken at with an electrolyte temperature of 200° C.

The energy management system according to aspects of the invention receives information from 1) the drive system of a motor vehicle comprising an engine, a transmission and a braking system, 2) a generator, 3) a large number of electric loads, and 4) a storage battery or system of storage batteries, and controls the energy distribution in the system via this information. For example, the current engine rotational speed or the braking effort instantaneously occurring, together with the power consumption of the loads and the state variables which describe the battery, such as its charge content or its temperature, determines the power output from the generator, which is controlled by means of its excitation current, for example. The proportion of energy produced by the generator or by a system of a plurality of generators under given conditions is supplied to the battery system via an energy distributor is likewise determined by the energy management system.

The distribution of energy in the system is carried out while taking into account the efficiency of individual components involved in power generation, energy storage or power consumption. In particular, the control of energy distribution is carried out by means of a numerical comparison of the chains of efficiencies which result from the individual efficiencies of the components involved in power generation, energy storage and power consumption. In order to determine the overall efficiency of the storage unit which is associated with the system and comprises at least one energy store, the variables used are the state of charge and the temperature of the store and also the absolute magnitude of the charging and discharging currents, in order to incorporate its efficiency into the efficiency chain.

The internal combustion engine and/or the braking power over the period of the vehicle deceleration are available as mechanical energy source for generating electric power. As a further energy generator, a fuel cell or a secondary unit in the form of a further heat engine, for example, may be present in the system. The electric stores may be an extremely wide range of batteries based on electrochemistry and/or capacitor banks in, for example, redundant parallel circuits.

In the case of the vehicle battery normally used as an energy store, charging and discharging efficiency rise with increasing temperatures, current withdrawal is particularly efficient when the battery is fully charged, as opposed to the acceptance of charge, which functions particularly well in the case of a partly discharged battery. In addition, efficiency of the battery depends quite critically on the current intensity, both during discharging and charging. It may, therefore, be advantageous to use a two-component, controlled storage system, such as a combination of lead/acid battery and capacitor.

With regard to their efficiency and their influence on the generation and storage of the power, the typical loads of a vehicle electrical system can advantageously be controlled by means of a clocked energy supply.

According to the invention, the method to be applied for optimized energy management in a vehicle electrical system takes into account efficiency chains in the generation of electrical power.

First, the two main efficiency chains of power generation regarding improved efficiency and the decision to be derived from the latter as to which of the two possibilities is currently to be used are particularly important. The first chain is formed from the product of the current individual efficiencies of the internal combustion engine and the generator. It is known that both units have poor efficiencies at very low rotational speeds.

The second chain is formed from the generator efficiency for the braking energy recovery, multiplied by the overall efficiency (charging+discharging) of the electrical storage system.

The power provided in this way at a specific generator rotational speed $n_G$ and temperature $T_G$ with the efficiency $\eta_G$; ($n_G$, $T_G$ can be supplied to the loads at up to 100%, for example, or 100% can be loaded into the storage system with the efficiency $\eta_{SL}$ (Q, $T_s$, $I_{SL}$)). Q signifies the current state of charge, $T_s$ the temperature of the store and $I_{SL}$ the magnitude of the charge to be loaded in.

In actual fact, a mixed form is established in the system which supplies a part $\alpha$ of the generator current to the loads and offers the remainder $1-\alpha$ to the storage system.

In the case of a very low storage temperature, part of the electrical energy supplied by the generator can be used to bring the storage battery to a better efficiency level. In this case, the current storage efficiency is a function $\eta_{SL}$ (Q, $T_s$, $I^*_{SL}$) with the storage and heating current $I^*_{SL}$.

The optimization program of the energy management system determines the proportion $\alpha$, so that the generator current is divided up with the best possible efficiency. At the same time, a decision is made as to whether it is more expedient, in energetic terms, to draw the current currently needed in the electrical system from the store and not to excite the generator winding and/or to uncouple the generator mechanically from the engine or from the remaining drive train without the engine.

This decision is based on the alternative efficiency chains
$\eta_1 = \eta_G \cdot \eta_V$ (generator efficiency·load efficiency) or
$\eta_2 = \eta_{SE} \cdot \eta_V$ (discharging efficiency of the storage battery·load efficiency), the index SE representing the discharging efficiency of the store and likewise being a function of the state of charge Q, store temperature $T_s$, discharge current $I_{SE}$ and generator efficiency $\eta_G$.

The discharging efficiency of the store $\eta_{SE}$ is also a function of the average generator efficiency $\eta_G$, since the charge in the energy store or storage battery must first of all be provided by the generator system. However, the magnitude of the generator efficiency $\eta_G$ also further includes whether and in what ratio the mechanical work was supplied either by the engine or by the braking. If, therefore, it is determined that $\eta_2 > \eta_1$, then the energy management decides in favor of the power supply from the battery, specifically until this state is no longer given.

In the case of braking force recovery, in addition to moderate current during usual and quite frequent retardations, peak currents may also arise during very intensive braking operations. The energy management takes into account whether the braking energy can be stored and to what proportion, depending on the charging characteristics of the storage system.

If, for example, two stores are available, one being particularly suitable for the short-term acceptance of a very high braking output, then its absorption capacity will be determined by the energy management and, depending on the power absorption, transport with a low transmission power into the other storage medium will be initiated, or else will be fed immediately to the loads again. In this case, a generator operating as a drive motor to assist the internal combustion engine also counts as a load.

During time periods in which there is a general sparsity of energy in the electrical system, the energy management system can control the power demand of the loads in accordance with a stored priority list.

By means of the energy management system, in particular, a working point which is an optimum for the state of charge and for the temperature of the battery, will be complied with. This point in turn depends on the statistical distribution of the vehicle operating states and must be learned from the immediate past and interpolated into the future. As far as the immediate future of the driving system affecting the vehicle is concerned, the energy management system can receive this information by satellite (warning of a traffic jam, downward slopes and the like).

As a result of the extremely complex nature of electrochemical accumulators and the combination of physical and electrochemical storage systems, a main task of the energy management is optimal control of the state of charge and the temperature of these components.

Figure 2:
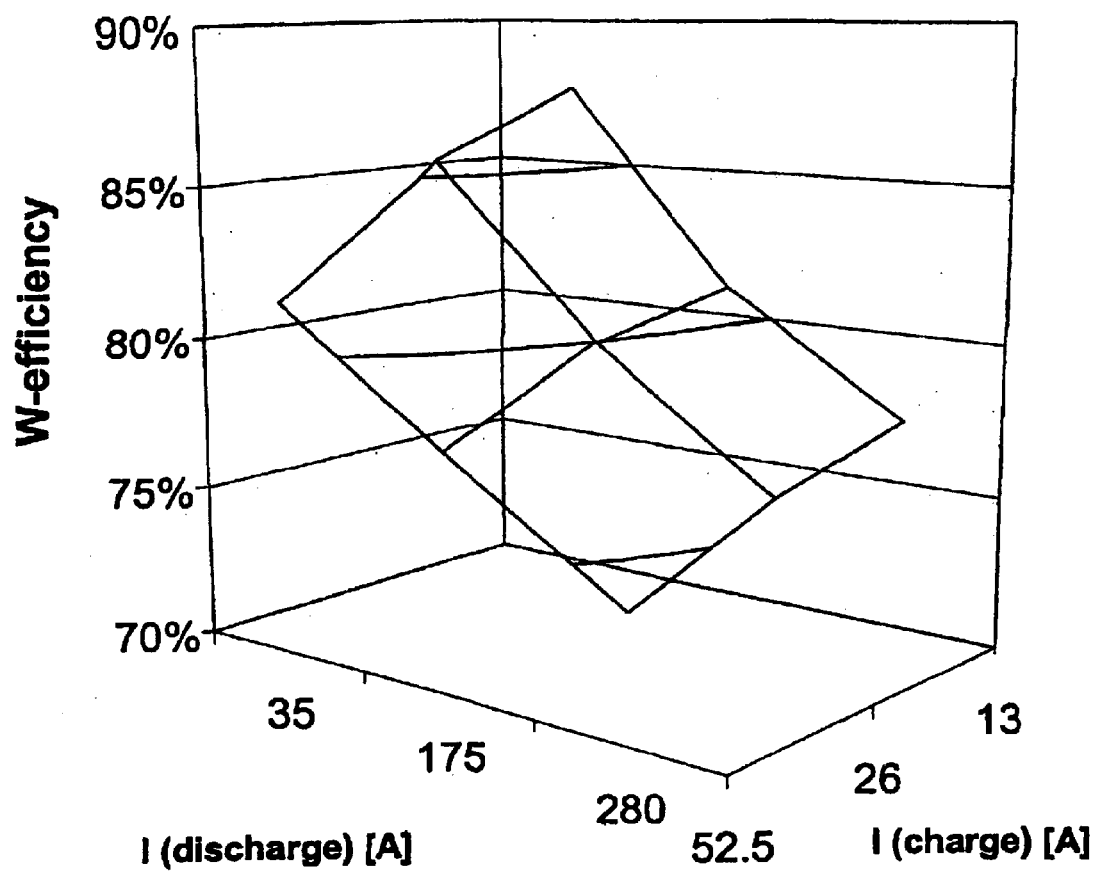
FIG. 2 is a graph of storage efficiency of a charge/discharge cycle of a lead/acid battery v. charging current v. discharging current in an 60%–80% range of state of charge taken at with an electrolyte temperature of 200° C.
Figure 3:
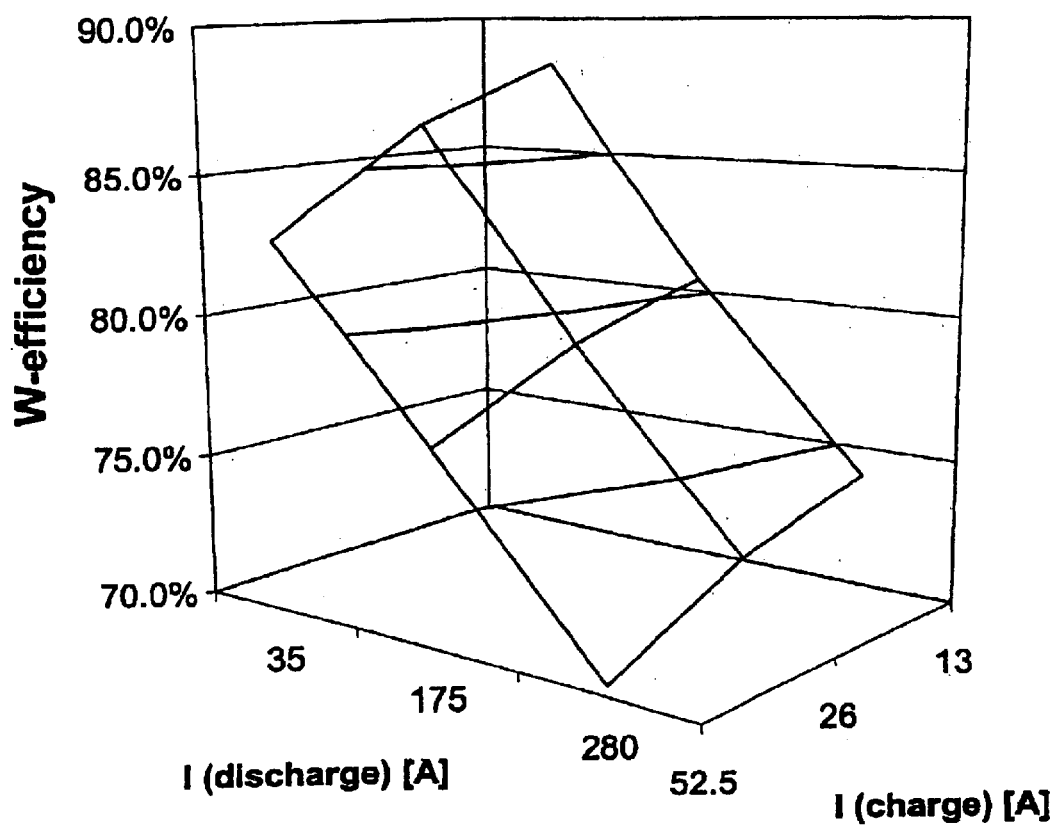
FIG. 3 is a graph of storage efficiency of a charge/discharge cycle of a lead/acid battery v. charging current v. discharging current in an 40%–60% range of state of charge taken at with an electrolyte temperature of 200° C.

In FIGS. 1 to 3, the storage efficiency $\eta_S$ of a charge/discharge cycle of a lead/acid battery $\eta_S = \eta_{SC} \cdot \eta_{SE}$) is plotted against the charging and discharging currents. FIG. 1 shows the 80%–100% range of the state of charge, FIG. 2 shows the 60%–80% range, and FIG. 3 shows the 40–60% range, in each case the electrolyte temperature being 200° C. The battery has a nominal capacity of 35 Ah and a cold-starting current of 315 A.

Figure 4:
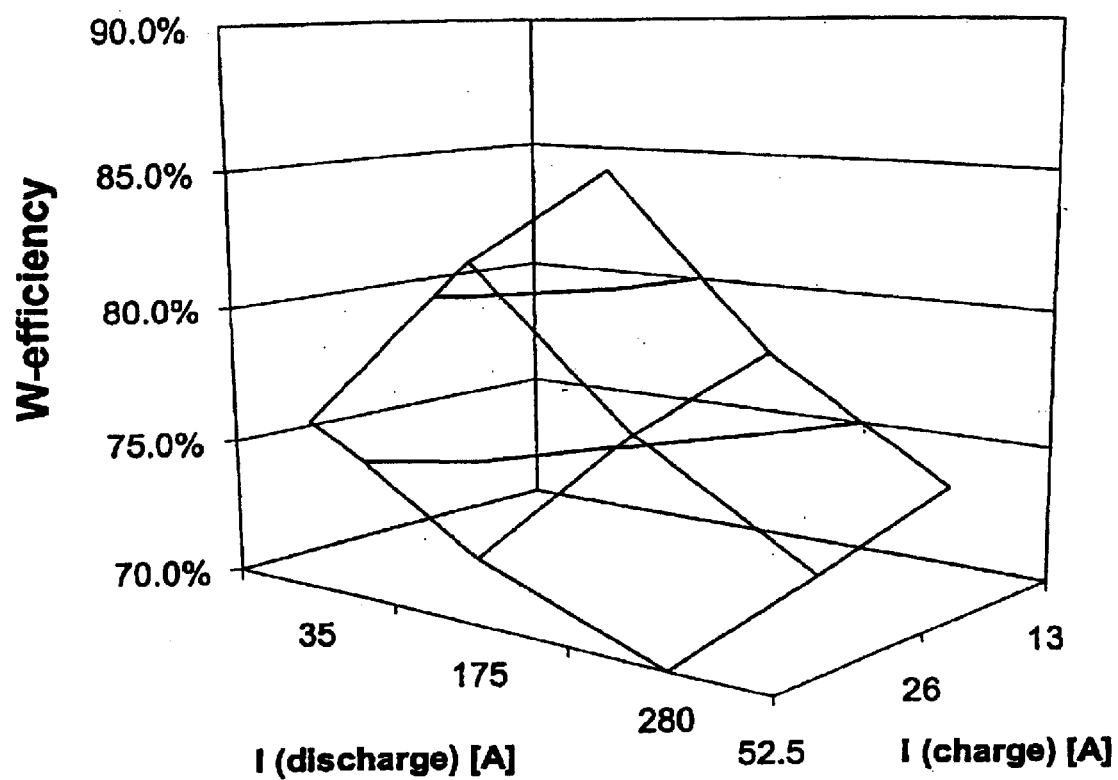
FIG. 4 is a graph similar to that shown in FIG. 2 except taken at an electrolyte temperature of 0° C.
Figure 5:
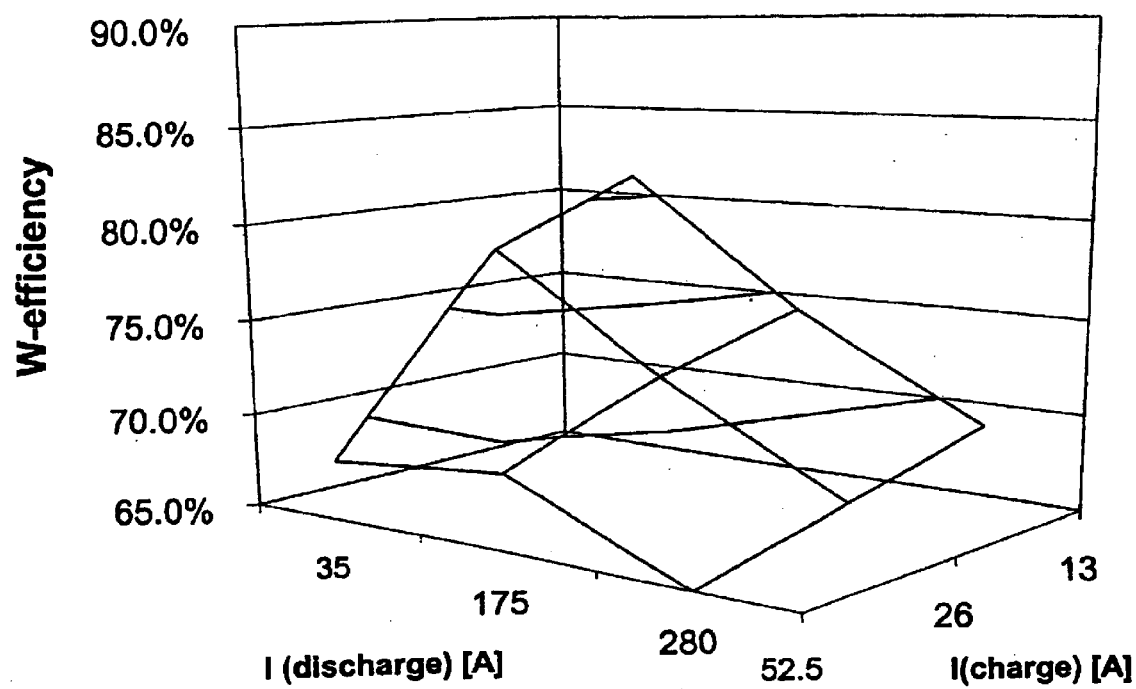
FIG. 5 is a graph similar to that shown in FIG. 2 except taken at an electrolyte temperature of 100° C.
Figure 6:
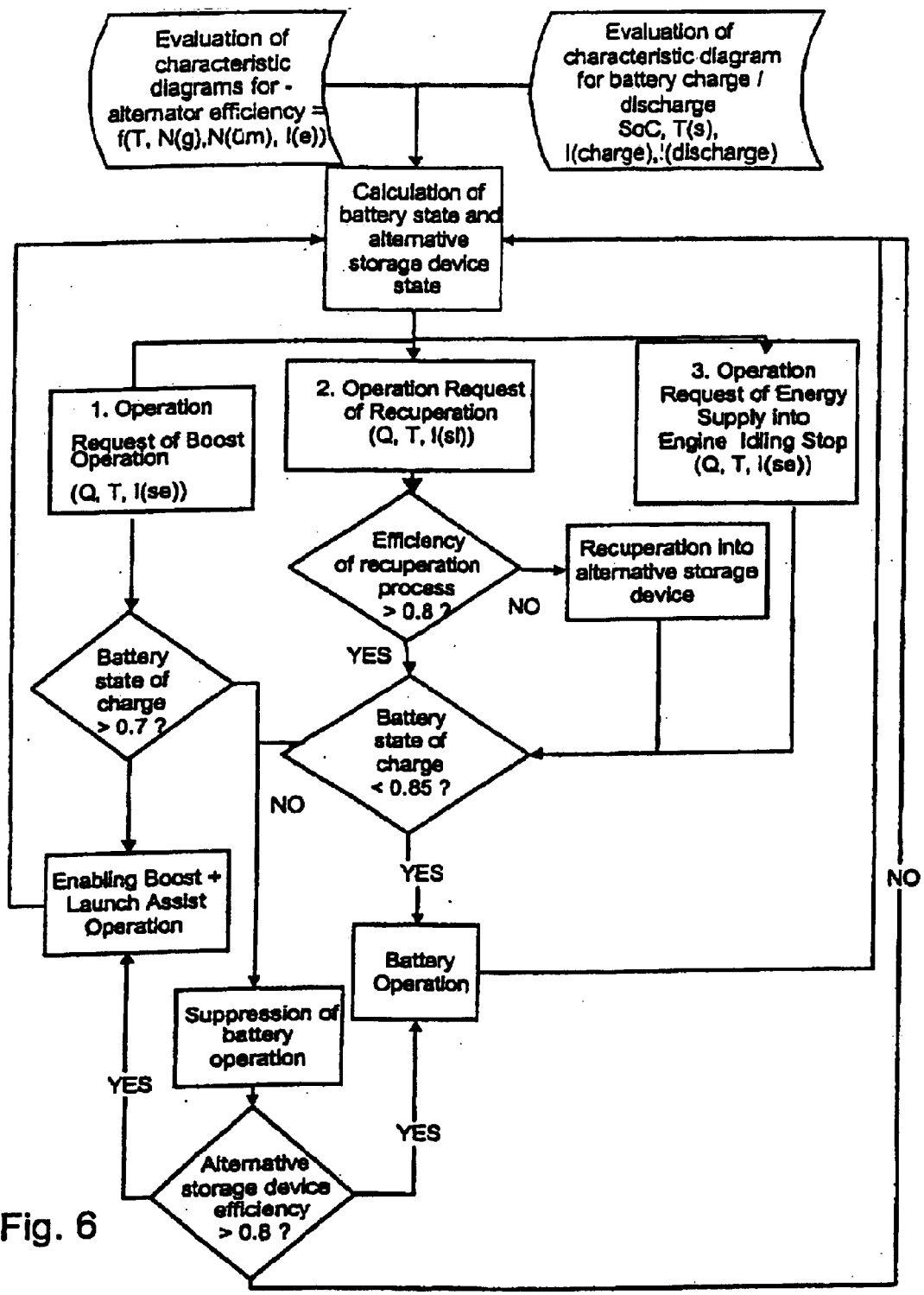
FIG. 6 is a block diagram showing selected aspects of operation of the energy management system according to the invention.

FIGS. 4 and 5 show the storage efficiency for the 60%–80% interval in the state of charge at 0° C. (FIG. 4) and −10° C. (FIG. 5). From the Figures, the differently intense influence of temperature and range of state of charge on the charging/discharging efficiency of the lead-acid accumulator can be seen. The lead-acid accumulator shows a maximum storage efficiency of about 87%. This efficiency can be reduced to about 68% as a result of changes in the temperature and state of charge.

While a reduction in the state of charge interval SOC in the range of small charging/discharging currents has no significant effect on the storage efficiency, even moderate currents ($I_{charge}$=26 A; $I_{discharge}$=176 A) have the effect of an average efficiency penalty of −2.5% if the state of charge range is reduced by 10%. Accordingly, the SOC parameter has a more intense effect on the inclination of the storage efficiency surface as charging/discharging currents increase.

On the other hand, a reduction in the temperature (FIG. 4 and FIG. 5) results in a reduction in the overall area of the storage efficiency covered by the charging/discharging current. For example, a reduction in the temperature by 10° C. has the effect of a decrease of 5% in the storage efficiency. In this case, the inclination of the surface remains constant as the temperature decreases in conjunction with an identical state of charge interval.

The change in the daily behavior of the two parameters SOC and battery temperature has a different effect over the yearly cycle of the vehicle operation. The temperature increase, which begins during the cold-starting operation, can be up to about 50° C. until the operating temperature of the engine is reached, if the store is accommodated under the engine hood. As a result, the storage efficiency changes by up to about 15%.

Given states of charge of different levels, it is possible for a change in the storage efficiency of up to about 5-about 10% to occur.

On the basis of the fuel use for the vehicle, the sliding average $\eta_G$ of the generator efficiency and of the drive train is also incorporated in the overall battery efficiency $\eta_s$. It is, therefore, advantageous to describe the overall battery efficiency as accurately as possible as a function of the state of charge, temperature and charge/discharge cycle.

For example, for a storage battery with 35 Ah capacity and a cold-starting current of 315 A, the formulation according to the invention of an appropriate rule is as follows:

$$\eta_s(\text{overall battery efficiency})=\eta_0+\eta_1+\eta_2$$

Here, $\eta_0$ takes the pure temperature influence into account as follows:

$$\eta_0=74.7\%+0.25\cdot T(°\,C.)$$

$\eta_1$ is a function of the state of charge interval SOC and of the charging current $I_{SE}$ $$\eta_1=0.14-0.094 SOC\,(\%)-(0.001-7\cdot 10^{-3}\cdot SOC\,(\%))\cdot I_{SE}(A),$$

$\eta_2$ depends on the charging current $I_{SL}$ $$\eta_2=0.02-0.001\cdot I(A).$$

However, this set of equations for determining the overall charging/discharging efficiency, for example, of a lead/acid battery, does not include the effect of aging. However, this is in principle possible using methods of permanent battery monitoring, in particular, during the starting operation. In the case of other energy stores, such as double-layer capacitors, which are extremely effective in combination with a lead/acid battery, the aging effect can be ignored, as measured over the lifetime of an automobile.

The particular advantages of taking the efficiency of the individual components of the vehicle electrical system into account in the energy management system can be seen in the fact that, by means of intelligent management of the electrical energy in the vehicle electrical system, the overall system efficiency can be increased considerably and, as a result, the fuel consumption can be reduced considerably. For this purpose, the EMS described in accordance with the invention should be informed at every operating instant about the current technical data of the units involved in power generation, power consumption and its storage and, on the basis of the numerical results of an algorithm whose basis is formed by the individual component efficiencies, a decision is made as to how the flows of energy are to be divided up optimally with the effect of the best overall efficiency. Only with vehicles which have such an EMS is the ambitious objective of significantly reducing fuel consumption to be achieved, in addition to the introduction of all the previously known measures.

In selected preferred embodiments, the invention includes one or more of the following features:

- during selected instants of operation of the motor vehicle, two efficiency chains determined from products of a) current individual efficiencies for an internal combustion engine in the motor vehicle in combination with the generator driven by the internal combustion engine, and b) the generator driven by braking energy in combination with the electric store, which are compared by the controller;
- determinations required at the selected instants about current source of an electrical supply in the electrical system depend on the magnitude of the efficiency chains;
- an energy storage unit which comprises at least one energy store, wherein the controller determines overall efficiency of the energy storage unit based at least partially on state of charge of the store, temperature of the store and absolute magnitude of charging and discharging currents of the store;
- a fuel cell;
- at least one double-layer capacitor in the electrical system; and/or
- electrical loads which can be switched on and off in accordance with a predefined priority list or energy consumption of motor vehicle components can be restricted by the controller.

What is claimed is:

1. An energy management system for an electrical system of a motor vehicle subjected to a large number of loads, comprising:
   at least one generator;
   at least one storage battery; and
   a controller of energy distribution in the, system which bases such control at least on efficiency of individual components of the motor vehicle involved in power generation, energy storage and power consumption;
   wherein during selected instants of operation of the motor vehicle, two efficiency chains determined from products of (a) current individual efficiencies for an internal combustion engine in the motor vehicle in combination with the generator driven by the internal combustion engine, and (b) the generator driven by braking energy in combination with the electric store, are compared by the controller.

2. The energy management system according to claim 1, wherein determinations required at the selected instants about current source of an electrical supply in the electrical system depend on the magnitude of the efficiency chains.

3. The energy management system according to claim 2, further comprising an energy storage unit which comprises at least one energy store, wherein the controller determines overall efficiency of the energy storage unit based at least partially on state of charge of the store, temperature of the store and absolute magnitude of charging and discharging currents of the store.

4. The energy management system according to claim 3, further comprising at least one double-layer capacitor in the electrical system.

5. The energy management system according to claim 3, wherein electrical loads can be switched on and off in accordance with a predefined priority list or energy consumption of motor vehicle components can be restricted by the controller.

6. The energy management system according to claim 2, further comprising a fuel cell.

7. The energy management system according to claim 2, further comprising at least one double-layer capacitor in the electrical system.

8. The energy management system according to claim 2, wherein electrical loads can be switched on and off in accordance with a predefined priority list or energy consumption of motor vehicle components can be restricted by the controller.

9. The energy management system according to claim 1, further comprising an energy storage unit which comprises at least one energy store, wherein the controller determines overall efficiency of the energy storage unit based at least partially on state of charge of the store, temperature of the store and absolute magnitude of charging and discharging currents of the store.

10. The energy management system according to claim 9, further comprising a fuel cell.

11. The energy management system according to claim 9, further comprising at least one double-layer capacitor in the electrical system.

12. The energy management system according to claim 9, wherein electrical loads can be switched on and off in accordance with a predefined priority list or energy consumption of motor vehicle components can be restricted by the controller.

13. The energy management system according to claim 1, further comprising a fuel cell.

14. The energy management system according to claim 1, further comprising at least one double-layer capacitor in the electrical system.

15. The energy management system according to claim 1, wherein electrical loads can be switched on and off in accordance with a predefined priority list or energy consumption of motor vehicle components can be restricted by the controller.

* * * * *